(12) United States Patent
Erez et al.

(10) Patent No.: US 9,658,790 B2
(45) Date of Patent: May 23, 2017

(54) MEMORY SYSTEM AND METHOD FOR POWER-BASED OPERATION SCHEDULING

(71) Applicant: SanDisk Technologies Inc., Plano, TX (US)

(72) Inventors: Eran Erez, San Jose, CA (US); Alex Mostovoy, Beer Sheva (IL)

(73) Assignee: SanDisk Technologies LLC, Plano, TX (US)

( * ) Notice: Subject to any disclaimer, the term of this patent is extended or adjusted under 35 U.S.C. 154(b) by 41 days.

(21) Appl. No.: 14/616,376

(22) Filed: Feb. 6, 2015

(65) Prior Publication Data
US 2016/0231957 A1    Aug. 11, 2016

(51) Int. Cl.
*G06F 12/00*  (2006.01)
*G06F 3/06*  (2006.01)
*G06F 13/18*  (2006.01)

(52) U.S. Cl.
CPC .......... *G06F 3/0625* (2013.01); *G06F 3/0619* (2013.01); *G06F 3/0655* (2013.01); *G06F 3/0659* (2013.01); *G06F 3/0688* (2013.01); *G06F 13/18* (2013.01); *Y02B 60/1228* (2013.01)

(58) Field of Classification Search
CPC .... G06F 3/0625; G06F 3/0619; G06F 3/0655; G06F 3/0659; G06F 3/0688; G06F 13/18
See application file for complete search history.

(56) References Cited

U.S. PATENT DOCUMENTS

| 5,894,579 A * | 4/1999 | Fujihara ................... G06F 1/26 708/100 |
| 2012/0210150 A1* | 8/2012 | de Lind van Wijngaarden ......... G06F 1/3212 713/320 |
| 2013/0138869 A1* | 5/2013 | Kwak ................. G06F 12/0246 711/103 |

* cited by examiner

*Primary Examiner* — Shawn X Gu
(74) *Attorney, Agent, or Firm* — Brinks Gilson & Lione

(57) ABSTRACT

A memory system and method for power-based operation scheduling are provided. In one embodiment, a memory system begins to perform a plurality of operations in an order in which they are stored in a queue. Before performing a next operation in the queue, the memory system determines whether the power consumed by performing the next operation would exceed a maximum power threshold. In response to determining that the power consumed would exceed the maximum power threshold, the memory system selects an operation out of order from the queue to perform instead, so the maximum power threshold would not be exceeded. Other embodiments are provided.

25 Claims, 7 Drawing Sheets

| Operations | Power Consumed |
|---|---|
| wr1 | 2 |
| wr2 | 2 |
| rd3 | 1 |
| rd4 | 1 |
| rd5 | 1 |
| rd6 | 1 |
| rd7 | 1 |
| wr8 | 2 |
| wr9 | 2 |
| wr10 | 2 |
| rd11 | 1 |
| rd12 | 1 |
| rd13 | 1 |

FIG. 3

| Schedule in Order | | | Total Power |
|---|---|---|---|
| wr1 | -- | -- | 2 |
| wr2 | rd3 | -- | 3 |
| rd4 | rd5 | rd6 | 3 |
| rd7 | wr8 | -- | 3 |
| wr9 | -- | -- | 2 |
| wr10 | rd11 | -- | 3 |

FIG. 4

| Power-Based Scheduling | | | Total Power |
|---|---|---|---|
| wr1 | rd3 | -- | 3 |
| wr2 | rd4 | -- | 3 |
| rd5 | wr8 | -- | 3 |
| rd6 | wr9 | -- | 3 |
| rd7 | wr10 | -- | 3 |
| rd11 | rd12 | rd13 | 3 |

FIG. 5

MEMORY SYSTEM AND METHOD FOR POWER-BASED OPERATION SCHEDULING

BACKGROUND

Some memory systems, such as a solid-state drive (SSD), contains a plurality of memory dies (e.g., in a multi-die package) that can be read or written in parallel. Such memory systems typically have a maximum power threshold that limits the number of operations that can be executed at any given time. Different operations may consume different power and have various power consumption profiles. For example, some operations (e.g., program operations) may require higher energy and peak currents than others (e.g. read operations). When the actual power consumption is nearing the maximum power threshold, a controller in the memory system can withhold an operation as to not exceed the limit. Ideally, the actual power consumed in the memory system is equal to the maximum power consumption. However, because different operations can consume different amounts of power, the actual power consumed when throttling operations in this way is often less than the maximum power consumption, resulting in inefficient power management.

BRIEF DESCRIPTION OF THE DRAWINGS

FIG. 3 is an illustration of operations stored in a queue of an embodiment and their power profiles.

FIG. 4 is a chart showing total power consumed when operations are executed in an order in which they are stored in a queue.

FIG. 5 is a chart showing total power consumed when a power-based operation scheduling technique of an embodiment is used.

DETAILED DESCRIPTION OF THE PRESENTLY PREFERRED EMBODIMENTS

Overview

Figure 1A:
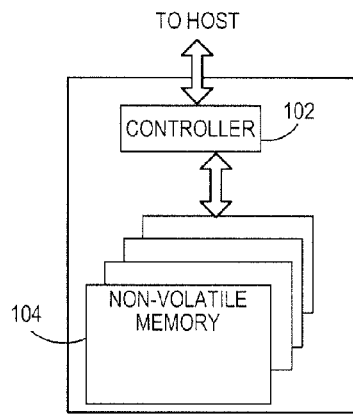
FIG. 1A is a block diagram of a non-volatile memory system of an embodiment.

By way of introduction, the below embodiments relate to a memory system and method for power-based operation scheduling. In one embodiment, a method for power-based operation scheduling is performed in a memory system comprising a memory and a queue storing a plurality of operations to be performed in the memory. The memory system begins to perform the plurality of operations in an order in which they are stored in the queue. Before performing a next operation in the queue, the memory system determines whether the power consumed by performing the next operation would exceed a maximum power threshold. In response to determining that the power consumed would not exceed the maximum power threshold, the memory system performs the next operation. In response to determining that the power consumed would exceed the maximum power threshold, the memory system selects an operation out of order from the queue to perform instead, so the maximum power threshold would not be exceeded.

In another embodiment, a memory system is provided comprising a first memory and a second memory configured to store a plurality of operations to be performed in the first memory. The memory system also comprises a power-based operation scheduling module in communication with the first and second memories, wherein the power-based operation scheduling module is configured to execute operations from the second memory in an order in which they are stored in the second memory unless performing an operation would exceed a maximum power limit, in which case the power-based operation scheduling module is configured to perform another operation stored in the second memory instead, so the maximum power limit would not be exceeded.

In yet another embodiment, a memory system is provided comprising a memory and a queue configured to storage a plurality of operations to be performed in the memory. The memory system also comprises a controller in communication with the memory and the queue, wherein the controller is configured to select an order in which operations from the queue are performed in the memory based on power profiles of the operations to provide better power utilization than if the operations were executed in the order in which they are stored in the queue.

In some embodiments, the method and/or memory system further includes the act of storing the plurality of operations in the queue in a same or different order than the order in which the operations were received. In some embodiments, the different order is determined by weighing the operations with one or more of the following: age of the operation, priority of the operation, type of the operation, and power consumed by the operation.

In some embodiments, the act of determining whether the power consumed by performing the next operation would exceed the maximum power threshold comprises determining if a sum of the power consumed by the next operation and a total power consumed by currently-performing operation(s) is below the maximum power threshold.

In some embodiments, the memory is a three-dimensional memory and/or the memory system is embedded in a host or is removably connected to a host.

Other embodiments are possible, and each of the embodiments can be used alone or together in combination. Accordingly, various embodiments will now be described with reference to the attached drawings.

EXEMPLARY EMBODIMENTS

As mentioned in the background section above, withholding a new operation in order to avoid exceeding a maximum power threshold of a memory system is often inefficient, as such throttling often results in consuming far less power than is allowed. The following embodiments can be used to provide a more efficient way of power management. Before turning to these and other embodiments, the following paragraphs provide a discussion of exemplary memory systems that can be used with these embodiments. Of course, these are just examples, and other suitable types of memory systems can be used.

Figure 1B:
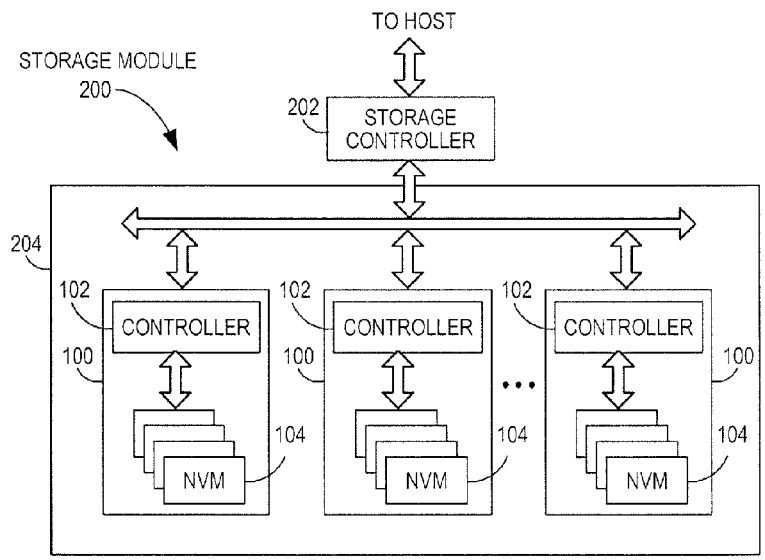
FIG. 1B is a block diagram illustrating an exemplary storage module of an embodiment.
Figure 1C:
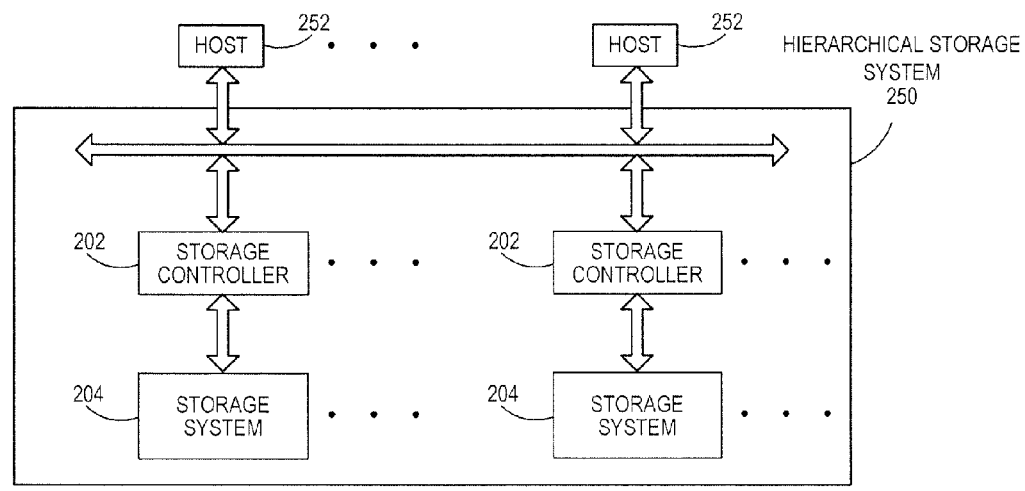
FIG. 1C is a block diagram illustrating a hierarchical storage system of an embodiment.

Memory systems suitable for use in implementing aspects of these embodiments are shown in FIGS. 1A-1C. FIG. 1A is a block diagram illustrating a non-volatile memory system according to an embodiment of the subject matter described herein. Referring to FIG. 1A, non-volatile memory system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Although, in the example illustrated in FIG. 1A, non-volatile memory system 100 (sometimes referred to herein as a storage module) includes a single channel between controller 102 and non-volatile memory die 104, the subject matter described herein is not limited to having a single memory channel. For example, in some NAND memory system architectures (such as the ones shown in FIGS. 1B and 1C), 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be an NVMe or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
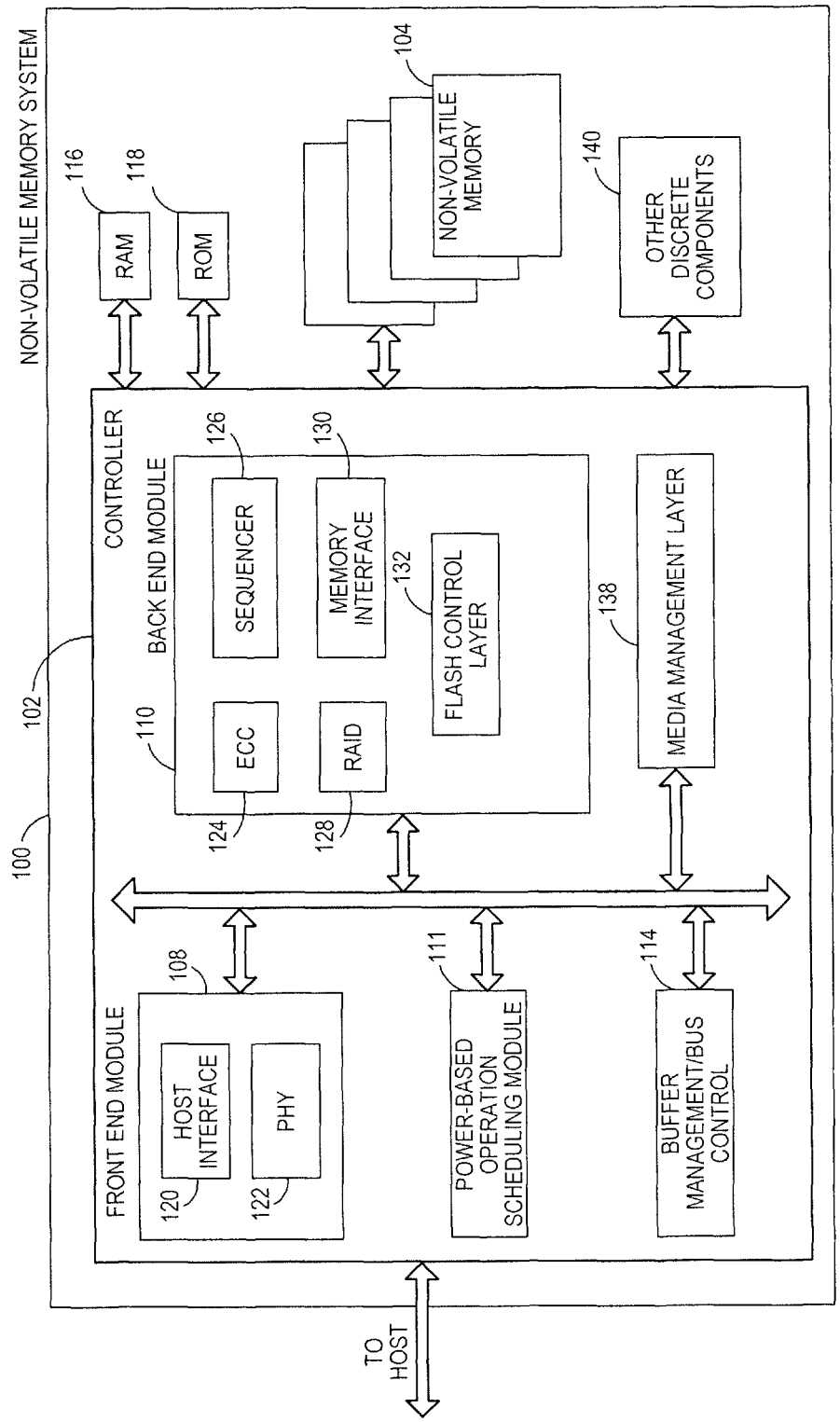
FIG. 2A is a block diagram illustrating exemplary components of the controller of the non-volatile memory system illustrated in FIG. 1A according to an embodiment.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a power-based operation scheduling module 111 configured to execute operations stored in a queue (e.g., RAM 116) in an order in which they are stored in the queue unless performing an operation would exceed a maximum power limit, in which case the power-based operation scheduling module 111 is configured to perform another operation stored in the queue, so the maximum power limit would not be exceeded. These modules will be discussed in more detail below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in FIG. 2A include media management layer 138, which performs wear leveling of memory cells of non-volatile memory die 104. System 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
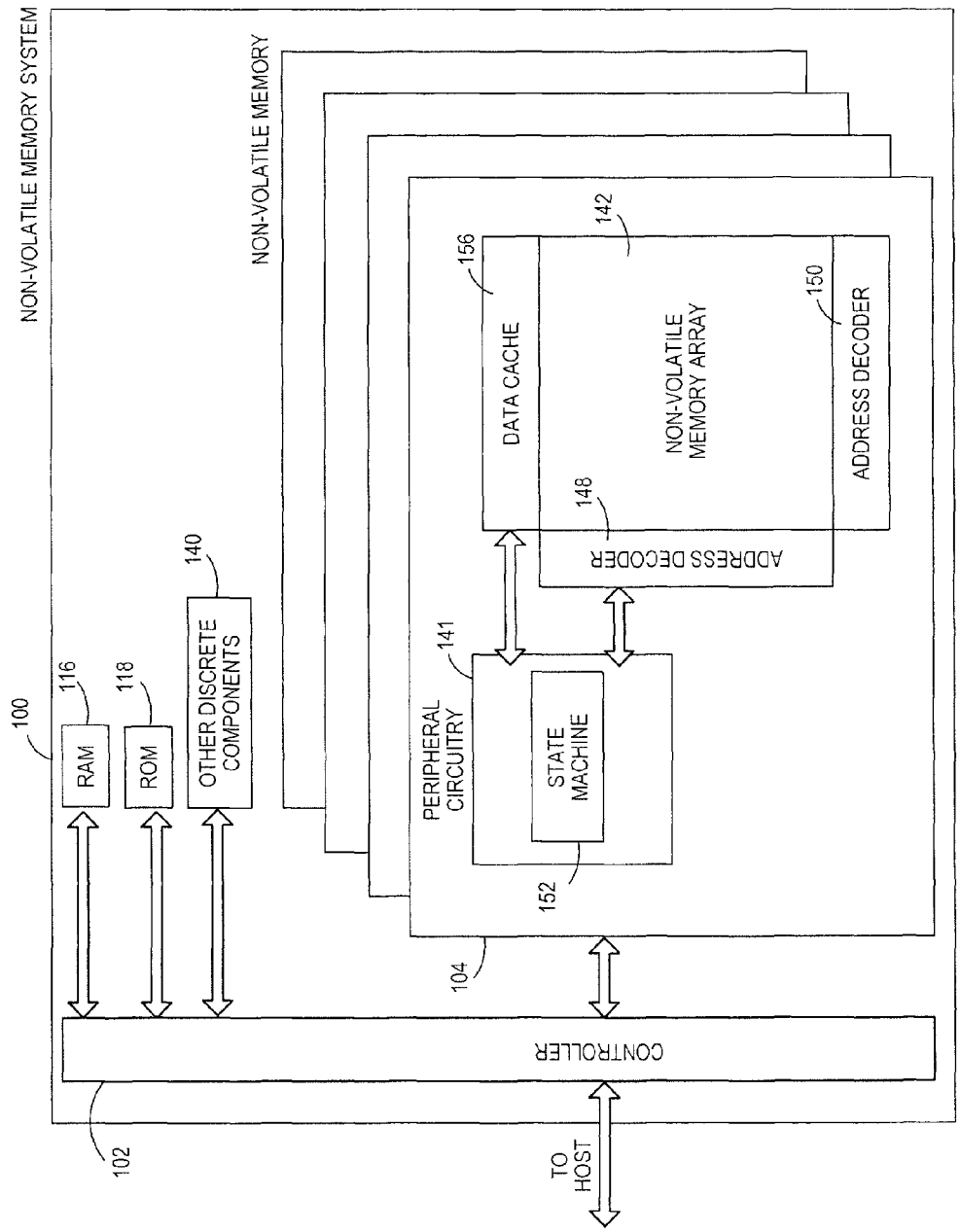
FIG. 2B is a block diagram illustrating exemplary components of the non-volatile memory of the non-volatile memory storage system illustrated in FIG. 1A according to an embodiment.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes a data cache 156 that caches data.

As mentioned above, memory systems often have a maximum power threshold or limit that limits the number of operations that can be executed at any given time. Different operations may consume different power and have various power consumption profiles. For example, some operations (e.g., program operations) may require higher energy and peak currents than others (e.g. read operations). When the actual power consumption is nearing the maximum power threshold, a controller in the memory system can withhold an operation as to not exceed the limit. Ideally, the actual power consumed in the memory system is equal to the maximum power consumption. However, because different operations can consume different amounts of power, the actual power consumed when throttling operations in this way is often less than the maximum power consumption, resulting in inefficient power management. This problem is illustrated in FIGS. 3 and 4.

FIG. 3 is an illustration of operations stored in a queue of an embodiment and their power profiles. In one embodiment, the operations are operations (e.g., read, write and/or erase) to be performed in the non-volatile memory 104. The queue can be in any suitable component of the memory system 100. For example, the queue can be in volatile memory (e.g., in the RAM 116) or in another volatile or non-volatile memory in the memory system 100. The queue can also be part of the non-volatile memory 104 where the operations will be performed. FIG. 3 also shows the power profiles of the operations in the queue. The power profiles show how much power will be consumed when the operation is performed in the non-volatile memory 104. For simplicity, the power profiles in this example are shown by two values: 1 for reads and 2 for writes, which means that writes consume twice as much power as reads. Of course, this is just an example, and power profiles can take different forms. For example, a power profile can describe energy and peak currents (for average power), current/power (for peak power), or any combinations thereof. In one embodiment, the memory system 100 stores the power profiles of various operations (e.g., in the ROM 118, non-volatile memory 104, or some other location in the memory system 100), while, in another embodiment, the memory system 100 calculates the power profiles on-the-fly.

In this example, the maximum power threshold of the memory system is 3, meaning that the total power consumed by one or more concurrent operations (on more than one memory die) cannot exceed 3. Also, for simplicity, it is assumed that write and read operations have the same durations. As illustrated in FIG. 4, if the operations were performed in the order in which they are stored in the queue, the memory system 100 is underutilized at some time periods. For example, the first two commands in the queue are write commands, each with a power profile of 2. Performing two write commands concurrently would result in a total power consumption of 4, which is over the maximum power threshold of the memory system 100. Accordingly, only the first operation is performed. So, for the period of time when the first operation is performed, the memory system 100 is underutilized, as only 2 of the 3 available power units are being consumed.

When the first operation is finished, the memory system 100 can perform the second and third operations concurrently, and their total power consumption is 3. Following that, the fourth, fifth, and sixth operations can be performed concurrently, and then the seventh and eighth operations can be performed concurrently. Since the ninth and tenth operations are both write operations, only the ninth operation can be performed, repeating the underutilization problem that occurred with the first and second operations. Accordingly, in this example, power efficiency is suboptimal.

To address this problem, instead of performing the operations in the order in which they are stored in the queue, the memory system 100 (e.g., the controller 102, the power-based operation scheduling module 111, or some other component of the memory system) can select an order in which operations are performed based on power profiles of the operations to provide better power utilization. For example, the memory system 100 can begin to perform a plurality of operations in an order in which they are stored in the queue. Before performing a next operation in the queue, the memory system 100 can determine whether the power consumed by performing the next operation would exceed a maximum power threshold. This can be done, for example, by determining if a sum of the power consumed by the next operation and a total power consumed by currently-performing operation(s) is below the maximum power threshold. If the predicted power consumed would not exceed the maximum power threshold, the memory system 100 can perform the next operation in the queue. However, if the predicted power consumed would exceed the maximum power threshold, then the memory system 100 can select an operation out of order from the queue to perform instead, so the maximum power threshold would not be exceeded. This is illustrated in FIG. 5.

As shown in FIG. 5, instead of just performing the first operation from the queue (and not performing the second operation because that would exceed the maximum power threshold for that time period), the memory system 100 in this embodiment looks for an operation in the queue that it can perform "out of order" to provide better power utilization than if the operations were executed in the order in which they are stored in the queue. So, the memory system 100 can find the next read operation (the third command) in the queue to perform concurrently with the first operation, as performing a write operation and a read operation in the same time period results in optimal power utilization. As will be discussed below, instead of choosing the next operation in the queue that will meet the power needs, the memory system 100 can choose an operation further down in the queue.

After the first and third operations have concluded, the second operation still needs to be performed. So, in the next time period (or later), the memory system 100 performs the second operation. In this case, the next operation to be performed after the second operation (which would be the fourth operation, as the third operation was already performed) is a read command, so the second and fourth operations can be performed concurrently. In the next time period, the fifth operation is a read command. Although the next two operations after that are also read commands that can be performed concurrently, the memory system 100 can choose to perform the eighth operation (a write operation) instead, as it may result in better power utilization, given the remaining operations in the queue to be performed. Accordingly, as shown by this example, the memory system 100 can select an order in which operations from the queue are performed based on power profiles of the operations to provide better power utilization than if the operations were executed in the order in which they are stored in the queue. That is, instead of just picking the next operation in the queue (or the next operation that would allow optimal power usage of a given time period), the memory system 100 can choose whatever order is desired, including an order that may result in sub-optimal power usage in the short-run but a more optimal power usage in the long run.

Figure 6:
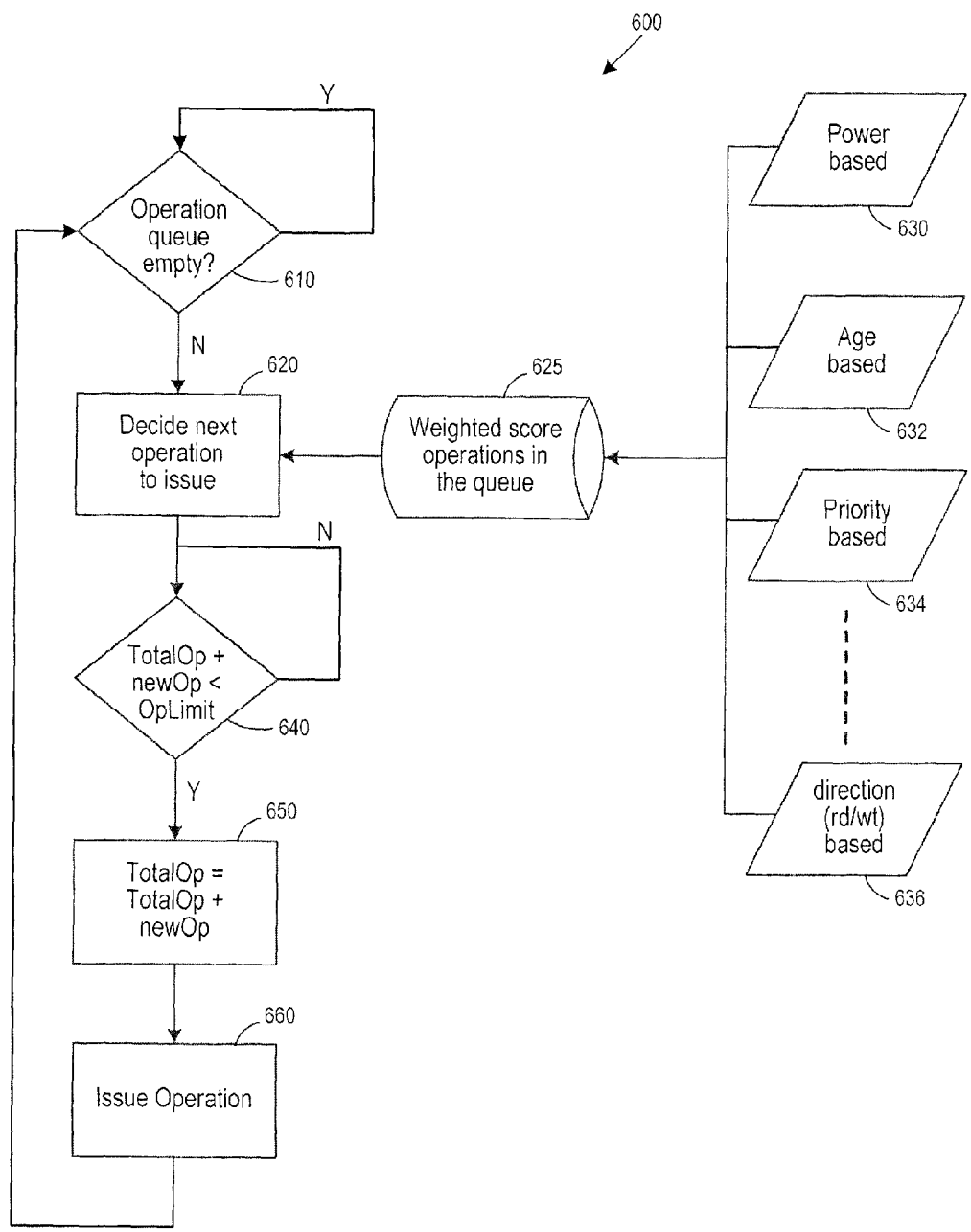
FIG. 6 is a flowchart of a method of power-based operation scheduling of an embodiment.

Turning again to the drawings, FIG. 6 is a flowchart 600 of a method of power-based operation scheduling of an embodiment. It should be noted that this is merely an example and that other operation selection algorithms are possible to select operations for execution based on a power profile. As shown in FIG. 6, the memory system 100 checks to see if the operation queue is empty (act 610). If it isn't, the memory system 100 decides which operation in the queue to issue (perform) next (act 620). The memory system 100 can do this by placing a weighted score for the operations in the queue (act 625). So, the operations can be stored in the queue in a different order than an order in which they are received (e.g., from a host or from a component in the memory system 100). For example, the order (weight) can be based on one or more of the following factors: power consumed by the operation, age of the operation, priority of the operation (e.g., as indicated by a host or the memory system 100), and type of the operation (e.g., writes over reads). Of course, these are just examples, and other factors can be used. Also, optimal power tuple and packing algorithms can be used to further optimize the system.

Figure 7:
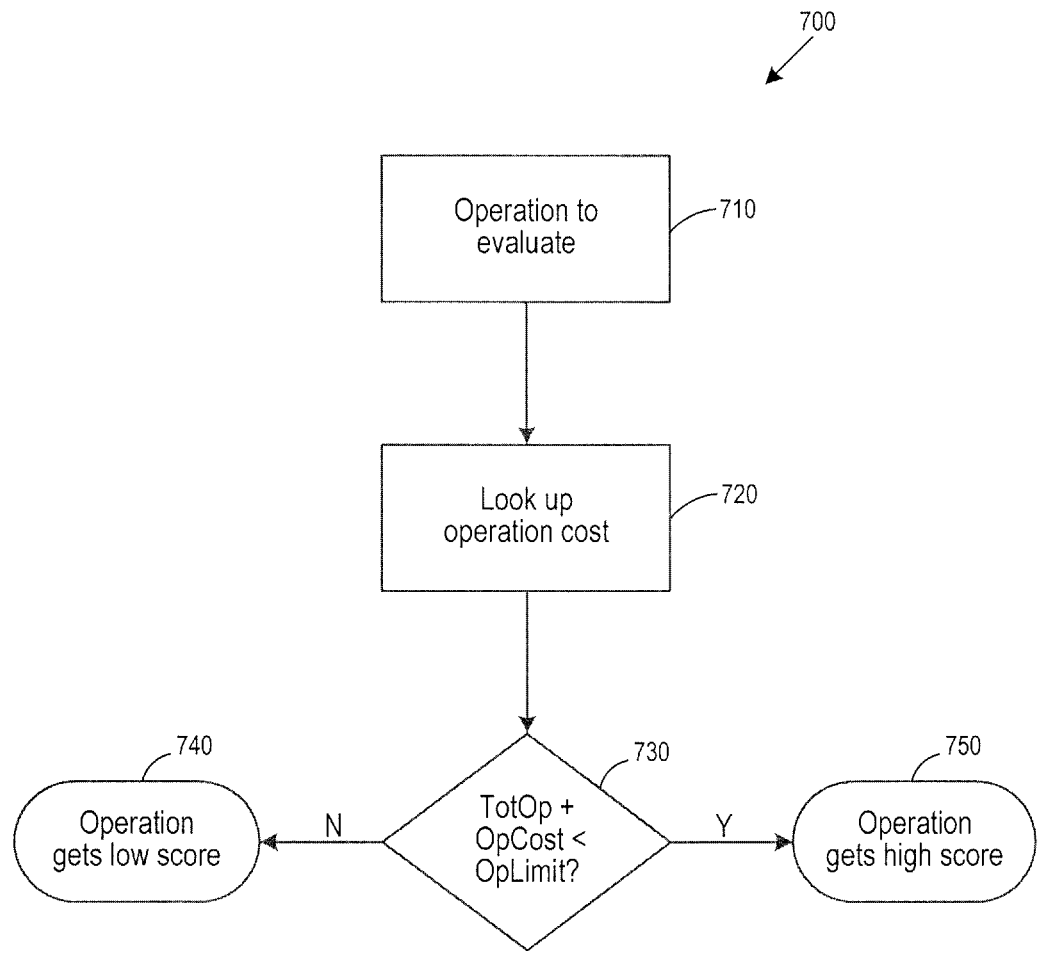
FIG. 7 is a flowchart of a power-weighing method of an embodiment.

Regarding the power consumption factor, FIG. 7 is a flowchart 700 illustrating how weight can be given to an operation based on its power consumption. The memory system 100 starts its evaluation of an operation (act 710) and looks up the operation's power cost (e.g., from a storage location in the memory system 100) (act 720). The memory system 100 then determines if the sum of the power consumption of the operations(s) that are being performed and the operation under evaluation is less than the maximum power threshold (act 730). If it isn't, the memory system 100 gives the operation a low score (act 740), so it will be performed later. Otherwise, the memory system 100 gives the operation a high score (act 750), so it will be performed sooner. (The age factor can be used as an "anti-aging" mechanism to prevent relatively high power operations that are assigned a low score from being indefinitely delayed.)

Returning to FIG. 6, the memory system 100 then determines whether the operation it decided to choose based on the weighted scores should be performed. In this embodiment, the memory system 100 determines if the sum of the power consumption of the operations(s) that are being performed and the chosen operation is less than the maximum power threshold (act 640). If it isn't, the memory system 100 waits until the next time period and then reevaluates. However, if it is, the memory system increases the total power consumption value in view of the chosen operation (act 650) and then issues the operation (act 660).

There are several advantages associated with these embodiments. For example, these embodiments can be used to address power inefficiencies in memory systems that issue/withhold memory operations based on projected total power consumption versus a maximum power consumption threshold. In this way, memory systems can reach higher performance by utilizing power to the fullest extent. Also, these embodiments can address power balancing in an attempt to flatten the consumption curve to uniform consumption across time. Additionally, it should be noted that the power management techniques disclosed in these embodiments can be hardware or firmware controlled. Also, each operation can be assigned a priority, so, in addition to power-based scheduling, priority knowledge can also be introduced. Further, while some of the above embodiments discussed timing windows, it should be noted that if the method is performed in hardware, back-to-back operations can be performed, thereby making the power consumption optimal Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention.

It is only the following claims, including all equivalents, that are intended to define the scope of the claimed invention. Finally, it should be noted that any aspect of any of the preferred embodiments described herein can be used alone or in combination with one another.

What is claimed is:

1. A method for power-based operation scheduling, the method comprising:
performing the following in a memory system comprising a memory and a queue storing a plurality of operations to be performed in the memory, wherein the memory system has a defined maximum power threshold that limits how much power can be consumed by the memory system at any time:
performing a first operation from the plurality of operations stored in the queue;
before performing a next operation in the queue, determining whether a sum of power that would be consumed by the next operation and power being consumed by the first operation would exceed the maximum power threshold;
in response to determining that the sum would not exceed the maximum power threshold, performing the next operation; and
in response to determining that the sum would exceed the maximum power threshold, selecting an operation out of order with respect to an order that the plurality of operations are stored in the queue, wherein the operation is selected by determining that a sum of power that would be consumed by that operation and power being consumed by the first operation would not exceed the maximum power threshold but would be closer to meeting the maximum power threshold than if another operation in the queue were selected instead.

2. The method of claim 1 further comprising storing the plurality of operations in the queue in an order in which they are received.

3. The method of claim 1 further comprising storing the plurality of operations in the queue in a different order than an order in which they are received.

4. The method of claim 3, wherein the different order is determined by weighting an operations with one or more of the following: age of that operation, priority of that operation, type of that operation, and power consumed by that operation.

5. The method of claim 1, wherein the memory is a three-dimensional memory.

6. The method of claim 1, wherein the memory system is embedded in a host.

7. The method of claim 1, wherein the memory system is removably connected to a host.

8. The method of claim 1, wherein the memory comprises a plurality of memory dies.

9. A memory system comprising:
a first memory;
a second memory configured to store a plurality of operations to be performed in the first memory; and
power-based operation scheduling means for executing operations from the second memory in an order in which they are stored in the second memory unless performing an operation would exceed a maximum power limit defined for the memory system that limits how much power can be consumed by the memory system at any time, in which case the power-based operation scheduling means is configured to determine which operation stored in the second memory to perform instead, so the maximum power limit would not be exceeded but also so that power consumed would be closer to the maximum power limit than if some other operation were performed instead.

10. The memory system of claim 9, wherein the plurality of operations are stored in the second memory in an order in which they are received.

11. The memory system of claim 9, wherein the plurality of operations are stored in the second memory in a different order than an order in which they are received.

12. The method of claim 11, wherein the different order is determined by weighting an operations with one or more of the following: age of that operation, priority of that operation, type of that operation, and power consumed by that operation.

13. The memory system of claim 9, wherein the first memory is a three-dimensional memory.

14. The memory system of claim 9, wherein the memory system is embedded in a host.

15. The memory system of claim 9, wherein the memory system is removably connected to a host.

16. The memory system of claim 9, wherein the first memory comprises a plurality of memory dies.

17. A memory system comprising:
a memory;
a queue configured to store a plurality of operations to be performed in the memory; and
a controller in communication with the memory and the queue, wherein the controller is configured to choose an order in which operations from the queue are performed in the memory based on power profiles of the operations to provide better power utilization within a maximum power limit defined for the memory system that limits how much power can be consumed by the memory system at any time than if the operations were executed in an order in which they are stored in the queue, wherein the order is based on maximize use of the maximum power limit.

18. The memory system of claim 17, wherein the plurality of operations are stored in the queue in an order in which they are received.

19. The memory system of claim 17, wherein the plurality of operations are stored in the queue in a different order than an order in which they are received.

20. The memory system of claim 19, wherein the different order is determined by weighting an operations with one or more of the following: age of that operation, priority of that, operation, type of that operation, and power consumed by that operation.

21. The memory system of claim 17, wherein the memory is a three-dimensional memory.

22. The memory system of claim 17, wherein the memory system is embedded in a host.

23. The memory system of claim 17, wherein the memory system is removably connected to a host.

24. The memory system of claim 17, wherein the memory comprises a plurality of memory dies.

25. A memory system comprising:
a memory;
a queue storing a plurality of operations to be performed in the memory, wherein the memory system has a defined maximum power threshold that limits how much power can be consumed by the memory system at any time;
means for performing a first operation from the plurality of operations stored in the queue;

means for, before performing a next operation in the queue, determining whether a sum of power that would be consumed by the next operation and power being consumed by the first operation would exceed the maximum power threshold;

means for, in response to determining that the sum would not exceed the maximum power threshold, performing the next operation; and means for, in response to determining that the sum would exceed the maximum power threshold, selecting an operation out of order with respect to an order that the plurality of operations are stored in the queue, wherein the operation is selected by determining that a sum of power that would be consumed by that operation and power being consumed by the first operation would not exceed the maximum power threshold but would be closer to meeting the maximum power threshold than if another operation in the queue were selected instead.

* * * * *

UNITED STATES PATENT AND TRADEMARK OFFICE
CERTIFICATE OF CORRECTION

PATENT NO. : 9,658,790 B2  
APPLICATION NO. : 14/616376  
DATED : May 23, 2017  
INVENTOR(S) : Eran Erez et al.

Page 1 of 1

It is certified that error appears in the above-identified patent and that said Letters Patent is hereby corrected as shown below:

In the Claims

In Column 11, Claim 4, Line 43, after "by weighting" replace "an operations" with --an operation--.

In Column 12, Claim 12, Line 12, after "by weighting" replace "an operations" with --an operation--.

In Column 12, Claim 17, Line 37, after "based on" replace "maximize" with --maximized--.

In Column 12, Claim 20, Line 46, after "by weighting" replace "an operations" with --an operation--.

In Column 12, Claim 20, Line 47, immediately after "priority of that" delete ",".

Signed and Sealed this  
Ninth Day of January, 2018

Joseph Matal  
*Performing the Functions and Duties of the*  
*Under Secretary of Commerce for Intellectual Property and*  
*Director of the United States Patent and Trademark Office*